March 30, 1943.  H. MIETH  2,315,345
BOX-TRAP FOR CATCHING MANY ANIMALS AT ONE SETTING
Filed Dec. 5, 1939
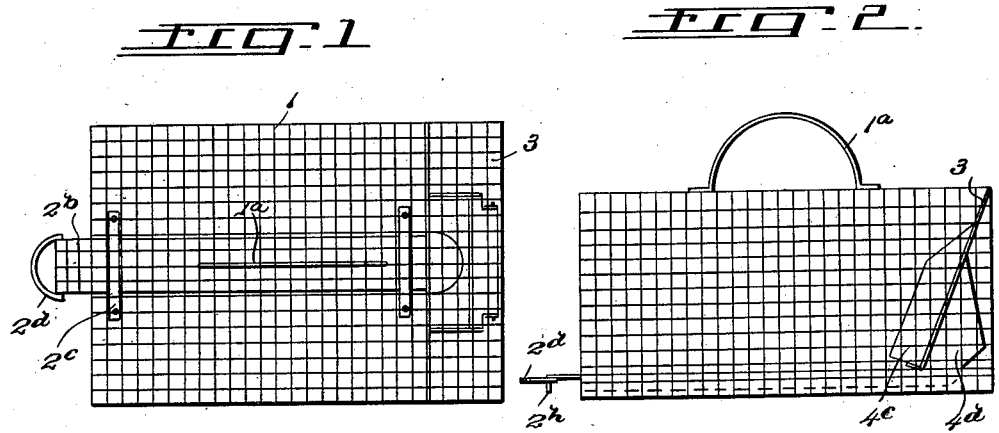
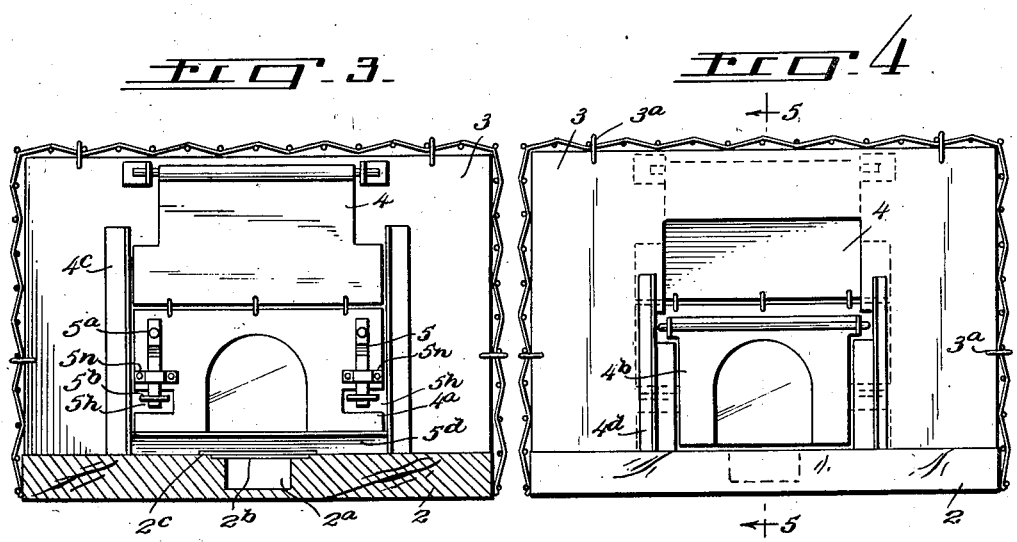
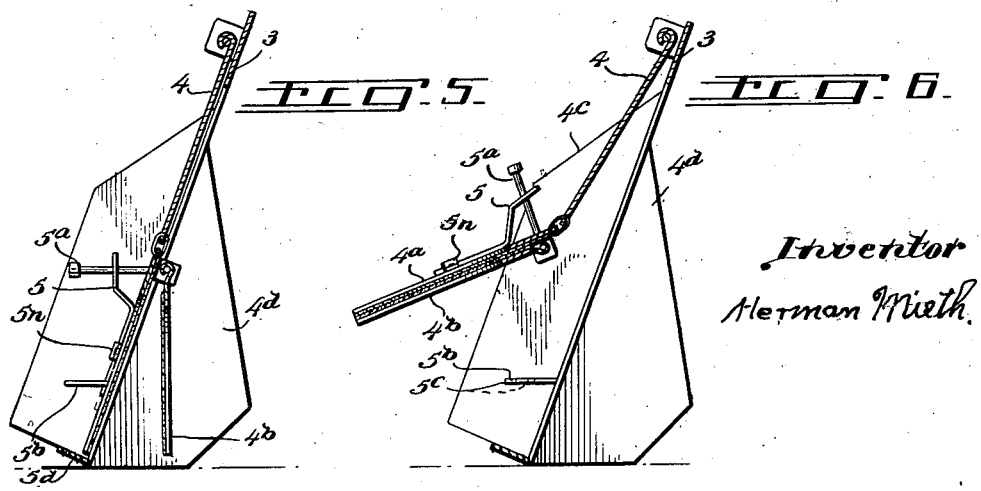
Inventor
Herman Mieth Patented Mar. 30, 1943

2,315,345

UNITED STATES PATENT OFFICE 2,315,345

BOX TRAP FOR CATCHING MANY ANIMALS AT ONE SETTING

Herman Mieth, Louisville, Ky.

Application December 5, 1939, Serial No. 307,687

1 Claim. (Cl. 43—66)

My invention relates to improvements in a box-trap for catching many animals at one setting, and the objects of my improvements are to provide a trap that will automatically unlock and allow an easy entrance to the animal trying to get to the food in a special container and that will lock again automatically when the animal is in the trap. Other objects will be disclosed in the specification.

I attain these objects by mechanism illustrated in the accompanying drawing, in which—

Figure 1 gives a plan view of the top of the trap showing the plan of the food-container; Fig. 2 is a side elevational view of my box-trap; Fig. 3 is a cross-sectional view of the box-trap from the central point inside the trap, looking toward the front thereof; Figure 4 shows the outside and entrance illustrating the attachment of the transparent outside-wing to the inside-wing, and wall with baffle plates; Figure 5 is a cross-section of the doors of the trap taken on the line 5—5 of Figure 4 showing the doors locked; Figure 6 is a view similar to Figure 5, showing the doors open.

Similar numerals refer to similar parts throughout the several views.

The box 1, Figure 1, is of wire-mesh and preferably rectangular, with the bottom of wood or any other suitable material 2 Figure 3, the wire-rings 3a Figure 4 shows how the sheet-metal wall is fastened to the box wire-mesh, though this wall may be made of any other material. The bail 1a is shown in Figure 2.

The food-container plan is represented in Figure 1, where 2b is the sliding wire-cover, 2c the cross-bands for holding the wire-cover in service position, 2d the bail-handle of the sliding cover; 2b carries 2h at right-angles thereto, in order to stop a forward movement of 2b at the point of contact; 2h, being of transverse wires, the same width as 2b; 2a, Fig. 3, illustrates the depth and width of the groove.

The sloping front sheet-metal wall 3 is shown in its inside and outside elevation, also illustrating the plan as well as the elevational view of the edges. Fig. 4, is an outside elevation of the entrance end. This front wall 3 is fastened at the top and sides thereof to the wire of the box-trap by means of the wire-rings 3a. The inside baffle-plates, 4c, 4c, are fastened to the inside of the sloping front wall 3, and stand out at right-angles thereto, as shown in Figs. 3 and 6, and the outside baffle-plates 4d, 4d, are fastened to the outside of said front wall and stand out at right-angles thereto, as shown in Figs. 4, 5 and 6.

The upper portion of the front swinging door 4 is composed of sheet metal, and the lower portion of said door consists of two wing-doors, an inside wing-door 4a and an outside wing-door 4b. The front door 4 swings inward from two pintle-hinges attached on either side thereof to the inside of the sloping front wall, near the top thereof, as shown in Fig. 3. Both the inside wing-door 4a and the outside wing-door 4b, are composed of sheet metal, both being provided with windows of transparent material securely fixed into said doors near the bottom thereof, as shown in Figs. 3 and 4. The inside wing-door 4a is fastened to the lower edge of the upper portion of the swing front door 4 by means of wire-ring hinges, as shown in Fig. 3; and the outside wing-door 4b, not so wide as the inside wing-door 4a, is fastened to the upper portion of said inside wing-door, in pintle hinges on either side thereof, as shown in Fig. 4. The inside baffle-strips also constitute the wide frames in which the inside wing-door 4a opens and closes. These baffle-strips 4c and 4d, on each side of the wing-doors, and the baffle-base-strip at the bottom of the inside wing-door, are all part of the wall 3 and are at right-angles thereto; the base baffle-strip 5d extends across the entire width of the wing-door 4a and standing out a short distance therefrom when the wing-door is closed, as shown in Figs. 3 and 5; this baffle-strip allows the wing-doors 4a and 4b to open and close readily, and effectually prevents trapped animals from escaping out of the trap by nosing under the inside wing-door 4a. When the doors of the trap are closed, the outside wing-door 4b, when at rest, hangs down more nearly vertical than the inside wing-door 4a, as shown in Fig. 5; for this reason, I have welded the outside baffle-plates, 4d, 4d, to the outside of the sloping front wall, which stand out at right-angles thereto and set close enough to the wing-door 4b, to prevent a mouse or rat from edging in between the two wing-doors. An animal therefore, entering the box-trap, must enter by pushing the outside wing-door 4b inwardly.

On the inner side of the outer wing-door 4b, I have rigidly fastened a metal post 5a to said door near either side thereof, standing inwardly a short distance at right-angles thereto and near the top edge thereof, as shown in Figs. 3, 5 and 6. These posts 5a, 5a, pass through perforations in either side of the inside wing-door 4a, near the top edge thereof, as shown in Figs. 3, 5 and 6; and beyond the wing-door 4a, these posts pass through perforations in the upper ends of angular latches 5, 5, as shown in Figs. 3, 5 and 6. These two metal latches are held in their operative position on the inner surface of the inside wing-door 4a by means of metal cross-bands, 5n, 5n, the ends thereof being welded to the inner surface of said door. The operation and purpose of these latches will be clearly seen, after I have explained some other features of the latching of the inside wing-door 4a. For I have welded to the inner surface of the sloping front sheet-metal wall, on either side of the doorway thereof, a broad, flat metal plate 5b, horizontally disposed, as shown in Figs. 3, 5 and 6, each having in each of said plates, a transverse slot 5c, as shown in Fig. 6. These transverse slots 5c, 5c, in these two metal plates 5b, 5b, have been made to allow the latches, 5, 5, near the sides of the inner surface of the inside wing-door 4a, to pass down through these slots, 5c, 5c, and catch against the edges thereof to prevent the inside wing-door from being opened by a trapped animal. Now, the inside wing-door 4a is a little wider than the front doorway so that it overlaps the doorway on either side thereof; and accordingly, I have cut deep notches, 5h, 5h, into the edges of said wing-door on either side thereof, as clearly shown in Fig. 3, so that said wing-door opens and closes without touching the broad metal plates 5b, 5b. Now we can see how the angular latches are lifted out of their latched position in these slots, 5c, 5c to allow the inside wing-door to be opened when an animal enters the box-trap by pushing inwardly the outside wing-door; for when he pushes inwardly the outer wing-door 4b, the metal posts 5a, 5a, anchored to the inner surface thereof, swing upward taking with them the latches 5, 5, so that the inner wing-door is unlatched and free to swing upward and open, as shown in Fig. 6, and the animal passes into the trap. But as soon as the animal has passed into the trap both wing-doors by force of gravity swing back to their original position of rest as shown in Fig. 5, and the latches 5, 5, are pushed by the posts 5a, 5a, and slide down again into the latching-slots 5c, 5c, and the inner wing-door cannot be opened again from the inside of the box-trap, until the outer wing-door 4b is again pushed inwardly, lifting the latches out of the latching slots 5c, 5c. Now the outside wing-door 4b is not so wide as the inside wing-door 4a, as shown in Fig. 4, consequently the outer wing-door does not need to be notched to swing past the horizontal plates 5b, 5b.

Thus, it can readily be seen that I have designed and developed an efficient box-trap for catching many animals at one setting. But in the description of my new and useful box-trap for catching many animals at one setting, as set forth in the foregoing specification and the amendment thereof, it should be well understood that the specific detail of the various parts of the instant embodiment of my present invention, as I have illustrated in the drawing thereof and fully described, are not to be considered as limitations in the construction of my new box-trap; and while keeping within the scope of my invention and claim, I may make desirable modifications in these details to facilitate quantity production, or to economize in the fabrication of the parts thereof, provided I keep within the spirit and scope of my invention and claim.

Now, having thus described the various features of my new invention, the detail construction, arrangement and combination of its parts, as well as their function and the ways and means of their operation and application; those features and objects of my box-trap for catching many animals at one setting, that I consider new and useful for which I desire Letters Patent granted to me, I have hereinbelow pointed out specifically in the following claim.

I claim:

A box trap for catching one or more animals at one setting, having a front sheet metal wall provided with a door-frame, said wall being inclined downwardly and inwardly, a main door pivotally mounted at the top of said wall, said main door having upper and lower swingable parts, a second door in front of the first door and pivotally attached thereto, a rod secured to said second door, a latch slidably associated with the rod and with the lower part of the first door, an apertured metal plate for the latch secured to the door-frame, said lower part and said second door having aligned portions thereof formed of transparent material, inwardly extending baffles on the door-frame, perforated side top and rear walls and a bottom wall, whereby an animal attempting to enter the trap will engage the transparent portion of the second door thereby moving the rod and causing unlatching of the lower part of the first door and inward swinging movement of both doors to allow the animal to enter the trap.

HERMAN MIETH.